United States Patent [19]
Pollastro

[11] Patent Number: 4,702,627
[45] Date of Patent: Oct. 27, 1987

[54] BEARING BALL SPACING RETAINER

[75] Inventor: Giovanni Pollastro, Turin, Italy

[73] Assignee: Riv-Skf Officine Di Villar Perosa S.p.A., Turin, Italy

[21] Appl. No.: 804,351

[22] Filed: Dec. 3, 1985

[30] Foreign Application Priority Data

Dec. 4, 1984 [IT] Italy .............................. 54107/84[U]

[51] Int. Cl.⁴ ............................................ F16C 27/00
[52] U.S. Cl. ................................ 384/526; 29/148.4 C; 384/531; 384/576; 384/614; 384/623
[58] Field of Search ................. 29/148.4 C, 148.4 S, 29/148.4 A; 384/523, 526, 531, 576, 577, 614, 623

[56]  References Cited
U.S. PATENT DOCUMENTS 3,486,212 12/1969 Vannest ........................... 384/523 X
4,019,790 4/1977 Earsley et al. ....................... 384/526

Primary Examiner—Timothy V. Eley

[57]  ABSTRACT

Bearing ball spacing retainer made of elastically-deformable, synthetic material comprising a ring, a number of parts projecting in the direction of the bearing axis and on one side of the said ring, and a number of seats for balls is described; each of the said projecting parts comprises a pair of elastically-deformable tabs projecting in the said direction, a tooth also projecting in the said direction, and a notch designed to separate the said tabs from the said tooth.

9 Claims, 6 Drawing Figures

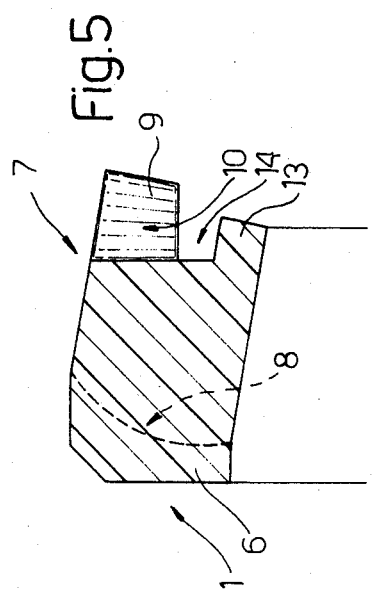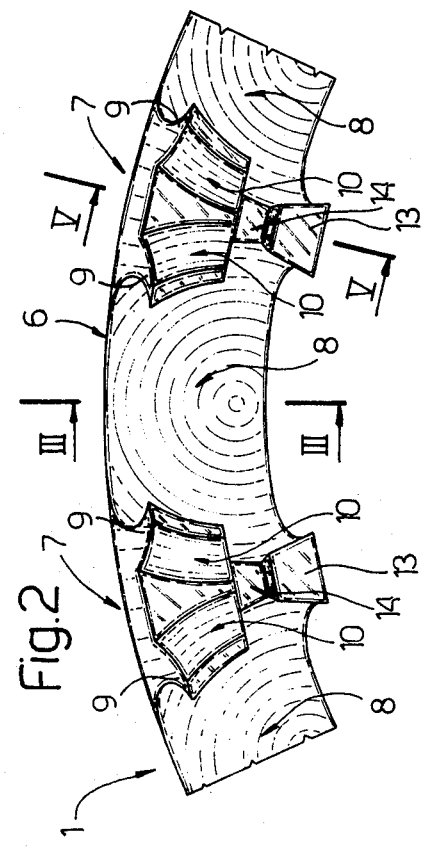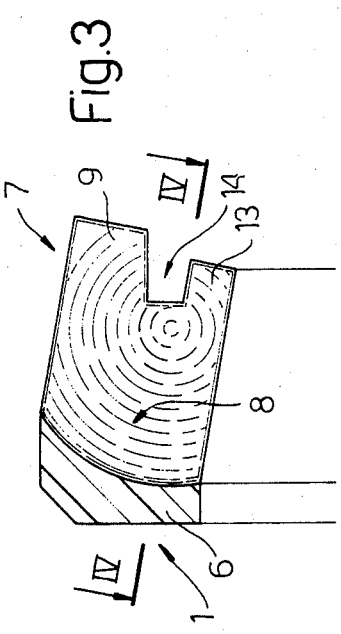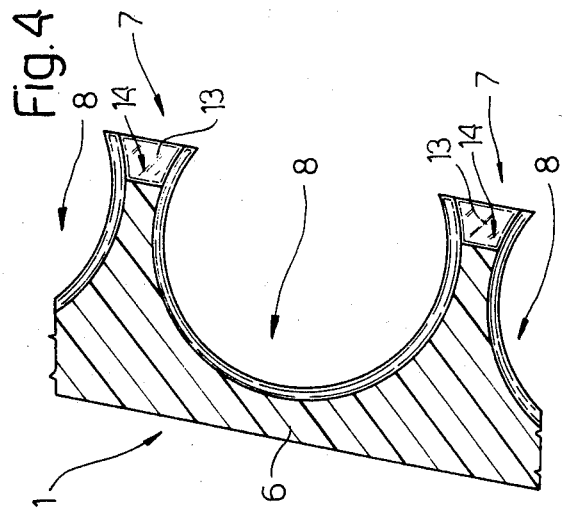

BEARING BALL SPACING RETAINER

BACKGROUND OF THE INVENTION

The present invention relates to a bearing ball spacing retainer made of thermoplastic material and enabling the manufacture of ball bearings having a large number of balls on which correct guiding action is exerted.

Spacing retainers of the aforementioned type usually comprise a ring and a number of pairs of deformable tabs projecting from the said ring in the retainer axis direction. On each pair of tabs adjacent with each ball, a ball seat is formed comprising a spherical surface portion. Each of the said tabs projects axially beyond the ball centre plane, in such a manner as to form a back draft for the ball with which it is in contact, and so prevent the ball from being withdrawn from its seat.

Though on the whole fairly satisfactory, a major drawback on retainers of the aforementioned type is that they are poorly suited for use on bearings having a large number of balls and, consequently, little clearance between adjacent ball surfaces. In fact, the gap formed between two adjacent balls is too small for accommodating, as it should, two retainer tabs, without the thickness of the latter, particularly the radially innermost part, being excessively reduced.

Consequently, retainers of the aforementioned type cannot be employed on bearings having a large number of balls or, more generally speaking, when the said balls are packed closely together.

SUMMARY OF THE INVENTION

The aim of the present invention is to provide a bearing ball spacing retainer of the aforementioned type, designed to overcome the aforementioned drawback, i.e. designed for use on high-load-capacity bearings having a large number of closely-packed balls.

With this aim in view, the present invention relates to a bearing ball spacing retainer made of elastically-deformable, synthetic material and designed to position the centres of the said balls in a notional circle lying in plane perpendicular to the bearing axis and in equally-spaced manner around the notional circle, the center of which lies in the bearing axis; the said retainer comprising a ring, a number of parts projecting in the direction of the bearing axis and on one side of the said ring, and a number of seats for the said balls, each seat consisting of a spherical surface and being formed on the said ring, between two adjacent said projecting parts; characterised by the fact that each of the said projecting parts comprises a pair of elastically-deformable tabs projecting in the said direction of the bearing axis and located externally of the notional circle in which the centers of the balls lie, a tooth also projecting in the said direction and being located inwardly of said notional circle, and a notch for separating the said tabs from the said tooth, the notch being essentially in the notional circle, the ball-ward surfaces of the said tabs and of the said tooth being spherical surface portions cooperating with said spherical surface portion of said seats.

BRIEF DESCRIPTION OF THE DRAWINGS

The present invention will now be described in more detail with reference to the attached drawings in which:

FIG. 2 shows a front view of part of the retainer according to the present invention;

FIG. 3 shows a section of the FIG. 2 retainer along line III—III;

FIG. 4 shows a section of the FIG. 3 retainer along line IV—IV;

FIG. 5 shows a section of the FIG. 2 retainer along line V—V;

DETAILED DESCRIPTION OF THE INVENTION

Figure 1:
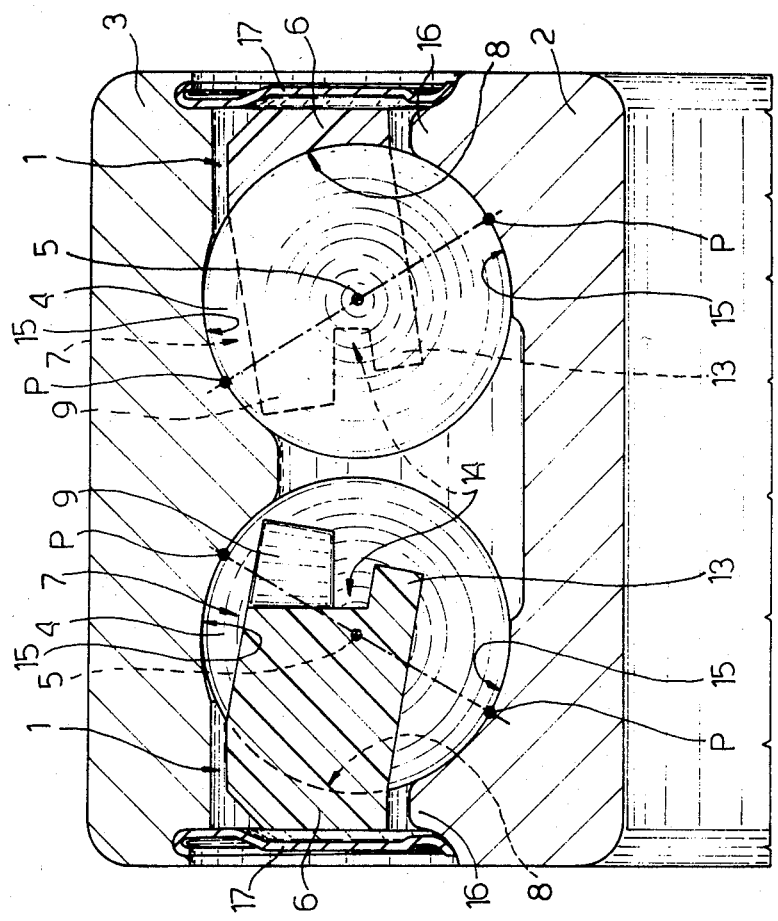
FIG. 1 shows a vertical section of a double-row oblique ball bearing having a pair of spacing retainers according to the present invention.

The spacing retainer according to the present invention is suitable for assembly on a ball bearing of the type shown in FIG. 1, the said bearing essentially comprising an inner ring 2 and an outer ring 3 with two rows of balls 4 inbetween. By virtue of the spacing retainer according to the present invention, the centres 5 of each row of balls lie in a notional circle which in turn lies in a plane perpendicular to the bearing axis. The bearing balls are equally-spaced around the notional circle, the center of which lies in the bearing axis.

The spacing retainer according to the present invention essentially comprises a ring 6 and a number of projecting parts 7, each of which projects axially from the said ring towards the centre 5 of each ball. Between two adjacent said projecting parts, a ball seat 8 (FIG. 2) is formed, the said seat being essentially defined by a spherical surface portion and, as shown clearly in FIGS. 2, 3 and 4, formed partly on ring 6 and partly on two adjacent projecting parts 7.

Figure 6:
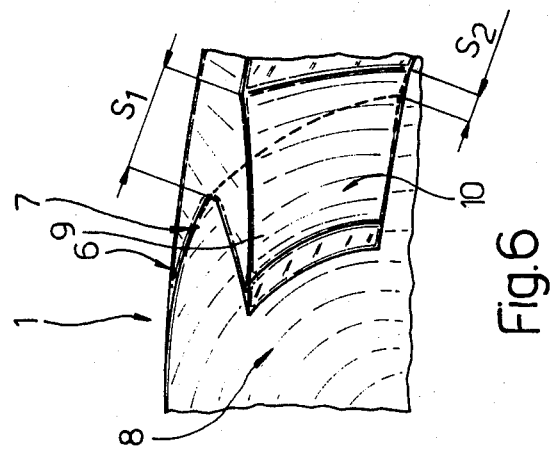
FIG. 6 shows a larger-scale detail of the retainer part shown in FIG. 2.

According to the present invention, each of the said projecting parts essentially comprises a pair of tabs 9, each projecting in a direction of the retainer axis respective said projecting part 7. Each of the said tabs 9 at one side, has a first pair of spherical surface portions which cooperate with the spherical surface portions of seats 8 and, on an opposite side, has a second pair of spherical surface portions 10 positioned in relation to the first spherical surface in such a manner that, as shown clearly in FIG. 6, the width of the root section on the said tab increases, starting from its base as viewed in FIG. 6, from a minimum of $S_2$ to a maximum of $S_1$.

Each of the said tabs is located outside the notional circle in which the centers of the balls 5 lie Furthermore, the root section of each said tab, as shown clearly in FIG. 5, lies in a plane which is parallel with the plane containing the ball centres and which, in relation to the said plane, containing the ball centers is closed to ring 6.

In like manner, the ball-ward spherical surface portion defining each tab 9 interferes with each ball in such a manner as to prevent it from moving out of its correct position when mounted inside the retainer.

According to the present invention, each projecting part 7 also comprises a tooth 13, the latter also projecting in the retainer axis direction and being located within the notional circle containing ball centres 5. Between the said tooth 13 and respective tabs 9, a notch 14 is formed for separating the former from the latter and essentially located on the notional surface in which the ball centers lie.

As shown clearly in FIG. 3, the axial length of tooth 13 may be shorter than that of tabs 9.

As also shown in FIG. 3, the mean diameter of the retainer ring is conveniently greater than the diameter of the notional circle containing ball centres 5. Furthermore, each projecting part 7 (with respective tabs 9 and tooth 13) inclines slightly towards the retainer axis.

Manufacture, assembly and operation of the retainer as described are as follows.

The retainer is made of thermoplastic material using traditional injection-molding techniques. As the mold parts forming the spherical surfaces of each seat 8 result in the formation of back drafts, during extraction, the said parts do not damage the retainer in that mutual displacement of the said parts and the retainer itself cause tabs 9 and teeth 13 to flex, the former tangentially and the latter radially in relation to the retainer. A flexed configuration of tooth 13 is obtained by bending downwards the tooth shown in FIG. 3.

The balls are fitted inside respective seats 8 on the retainer by simply flexing the two adjacent tabs 9 on each seat. During operation of the bearing, each ball is held in the correct position and prevented from accidentally slipping out of the retainer by the back draft consisting of the spherical surface portions formed on each tab 9 and tooth 13, and mating with the surface of the ball itself. Ball clearance is thus very small, in that, the gap between two adjacent balls and within the notional circle containing ball centres 5 does not actually house flexible tabs, but only tooth 13 the size of which, tangential with the retainer, is fairly small. As already stated, the said tooth, by virtue of the spherical surface portion defining it in the direction of the adjacent ball, acts as an efficient back draft preventing the ball from being withdrawn from the retainer.

By virtue of the geometrical feature already mentioned and whereby the mean radius of retainer ring 6 is considerably in excess of the radius of ball centres 5, the retainer according to the present invention is particularly suitable for use on oblique bearings, as shown in FIG. 1, i.e. on which contact points P between each ball and respective races 15 of inner ring 2 and outer ring 3 are on straight lines inclined at an angle of 0° to 90° in relation to the bearing axis and, therefore, forming part of a conical surface having its tip on the axis itself. On such bearings, in fact, race 15 on inner ring 2 presents an annular projection 16 projecting considerably inwards of the said ring 2 and which could interfere with ring 6 on retainer 1, should the said ring be formed in such a manner that its mean radius coincides with the radius of the notional circle containing ball centres 5. This is overcome, however, by virtue of the geometrical feature already mentioned and whereby retainer ring 6 is positioned essentially in the centre of the annular gap between annular projection 16, on inner ring 2, and outer ring 3. On account of the small size of ring 6, the spacing retainer according to the present invention does not interfere with sealing ring 17 on the bearing, the outer edge of the said ring being housed inside a respective groove on outer ring 3, whereas the inner edge is located next to annular projection 16 on inner ring 2, as shown in FIG. 1.

To those skilled in the art it will be clear that changes may be made to the arrangement described herein without, however, departing from the scope of the present invention.

I claim:

1. Spacing retainer for a ball bearing having an inner and an outer race, said retainer having a central axis and being made of elastically-formable, synthetic material, said retainer being effective to position bearing balls, with gaps therebetween, in equally spaced manner about a notional circle whose center lies in said central axis and whose circumference passes through centers of said bearing balls; said retainer comprising a ring, a number of parts projecting from said ring in direction of the retainer axis, a number of seats for said balls, each seat comprising a spherical surface portion formed in said ring between two adjacent said projecting parts, each of said projecting parts comprising (a) a pair of elastically-deformable tabs located externally of said notional circle, (b) a tooth located within said notional circle, and (c) a notch between said tabs and tooth to separate said tabs from said tooth and being located essentially on said notional circle, clearance between two adjacent bearing balls being minimized by virtue of said tooth alone being housed in a gap between said two adjacent bearing balls, the size of said tooth being substantially smaller than the size of said tabs in a direction tangential with the retainer.

2. Spacing retainer according to claim 1, wherein said tooth has an axial length smaller than that of said tabs.

3. Spacing retainer according to claim 1, wherein root sections of said tabs lie in a plane parallel to the said plane which is perpendicular to the retainer axis.

4. Spacing retainer according to claim 1, wherein said pair of tabs and said tooth of said projecting parts have spherical surface portions which cooperate with said spherical surface portions on said seats to prevent bearing balls from moving from said seats when seated therein.

5. Spacing retainer according to claim 1, wherein said retainer has a mean diameter greater than the diameter of said notional circle containing said ball centers; each of said projecting parts, together with the respective tabs and tooth, inclining slightly towards the retainer axis.

6. Spacing retainer for a ball bearing having an inner and an outer race, said retainer having a central axis and being made of elastically-formable, synthetic material, said retainer being effective to position bearing balls, with gaps therebetween, in equally spaced manner about a notional circle whose center lies in said central axis and whose circumference passes through centers of said bearing balls; said retainer comprising a ring, a number of parts projecting from said ring in direction of the retainer axis, a number of seats for said balls, each seat comprising a spherical surface portion formed in said ring between two adjacent said projecting parts, each of said projecting parts comprising (a) a pair of elastically-deformable tabs located externally of said circle, and (c) a notch between said tabs and tooth to separate said tabs from said tooth and being located essentially on said notional circle, said tabs and said tooth having spherical surface portions which cooperate with said spherical surface portions on said seats to prevent bearing balls from moving from said seats when seated therein, said pair of tabs having a root base portion from which they outwardly extend, each tab of said pair comprising first and second spherical surface portions shaped and related to one another to define at their root base portion a width which is greater than that at the outwardly extending end of each tab.

7. Spacing retainer according to claim 6, wherein said tooth has an axial length smaller than that of said tabs.

8. Spacing retainer according to claim 6, wherein root sections of said tabs lie in a plane which is parallel to said plane which is perpendicular to said retainer axis.

9. Spacing retainer according to claim 6, wherein said retainer ring has a mean diameter greater than the diameter of said circumference containing said ball centers; each of said projecting parts, together with the respective tabs and tooth, inclining towards the retainer axis.

* * * * *